United States Patent [19]

Bernou et al.

[11] Patent Number: 5,062,965
[45] Date of Patent: Nov. 5, 1991

[54] FILTRATION APPARATUS COMPRISING AN ULTRASONIC CLEANING DEVICE AND CORRESPONDING CLEANING PROCESS

[75] Inventors: Jean-Louis Bernou, Fresnes; Frederic Dufau, La Celle St Cloud; Isabelle Geahel, St Germain En Laye; Jean Hache, Voisins Le Bretonneux, all of France

[73] Assignees: Framatome, Courbevoie; Bertin & Cie, Plaisir, both of France

[21] Appl. No.: 432,825

[22] Filed: Nov. 7, 1989

[30] Foreign Application Priority Data

Nov. 7, 1988 [FR] France ................................ 88 14505

[51] Int. Cl.$^5$ .............................................. B01D 17/06
[52] U.S. Cl. .................................... 210/748; 210/332; 55/292
[58] Field of Search .................... 210/748, 332; 55/292

[56] References Cited

FOREIGN PATENT DOCUMENTS 579550 7/1959 Canada .................................. 55/292

OTHER PUBLICATIONS

WO89/05184 published 6/15/89, Laiho et al.

*Primary Examiner*—Bernard Nozick
*Attorney, Agent, or Firm*—Pollock, Vande Sande & Priddy

[57] ABSTRACT

The filtration apparatus comprises a bundle of porous filtering elements (12) which are disposed over a certain length of a casing (2) and over a substantial part of its cross-section, and at least one assembly of ultrasonic transducers (15) disposed in at least one cross-sectional plane of the casing regularly spaced at its periphery. Each of the transducers is placed within an opening passing through the casing in a direction perpendicular to the axis of the casing. Ultrasonic waves are emitted within the casing in the direction of the bundle of filtering elements in a zone delimited by a cone, the axis of which extends in a direction perpendicular to the filtering elements and the vertex of which is located in the vicinity of the wall of the casing. The particles torn out by the ultrasonic waves from the filtering elements are recovered by an evacuation conduit (8). The invention is applicable, in particular, to the treatment of fluid used in the nuclear industry, and of other dangerous products.

8 Claims, 5 Drawing Sheets

FILTRATION APPARATUS COMPRISING AN ULTRASONIC CLEANING DEVICE AND CORRESPONDING CLEANING PROCESS

FIELD OF THE INVENTION

The invention relates to a filtration apparatus comprising a device for the ultrasonic cleaning of its filtering elements and a corresponding cleaning process.

BACKGROUND OF THE INVENTION

Apparatuses are known which are used for the filtration of liquids and which comprise, within a casing, a set of filtering elements made of porous material which are disposed over a certain length of the casing in an axial direction and which occupy a substantial part of the cross-section of the casing. A conduit for the admission of liquid to be filtered, as well as a conduit for the evacuation of the liquid after filtration, open into the casing in zones situated on both sides of the zone occupied, along the axial direction of the casing, by the filtering elements.

The casing comprises a cover, on which the conduit for the evacuation of filtered liquid is generally fixed, this cover giving access to the set of filtering elements, for example for the purpose of carrying out replacement thereof.

During the operation of the filtration apparatus, the filtering elements made of porous material retain the impurities by the fluid, and these impurities progressively fill the interstices of the porous material.

The loss of head through the filtering elements increases, in the course of the utilization of the filtration apparatus. In order to maintain satisfactory conditions of operation of the filtration apparatus, it is necessary to regenerate the filtering elements after a certain operating time.

A first method of regeneration consist in replaceing all the filtering elements when the loss of head through these elements has exceeded a specified limiting value, for a given throughput.

This method involves disadvantages, because it necessitates the demounting of a part of the apparatus and because it involves the handling of a large volume of waste materials, comprising to all the impurities retained by the cleaned filtering elements and these filtering elements themselves.

This leads to increased labor cost and an increased period of non-availability of the filtration apparatus; furthermore, it may be necessary to handle and to process large quantities of waste materials, after cleaning of the filter.

Additional difficulties arise when the filtration apparatuses of the type described hereinabove are utilized for the processing of fluids containing impurities consisting of dangerous materials. This is so, for example, in the case of nuclear power stations, when the filtration apparatuses such as are described are utilised for the processing of a fluid transporting radioactive materials, for example for the processing of the cooling fluid of the reactor. In this case, the personnel entrusted with the replacement of the filtering elements must ensure the maintenance of a set having a large volume, enclosing a large quantity of radioactive material. Such personnel is thus exposed to ionising radiations and may be contaminated in the course of the maintenance.

A second process for the regeneration of the filtering elements of a filtration apparatus consists in isolating the apparatus from its normal circuit and, without demounting it, causing a certain quantity of clean fluid to pass in countercurrent through the filtering elements. These elements are then cleared of the particles retained during the operation of the apparatus. This method avoids the demounting of the filter and the replacement of the filtering elements. However, it only partially solves the problems associated with the recovery of waste materials during the operation of regeneration. These waste materials are, in fact, found again in the form of effluents consisting of the fluid utilized to carry out the cleaning of the filtering elements containing the waste materials separated from the filtering elements. The volume of fluid necessary to carry out the cleaning may be fairly large and, in the case of toxic or radioactive products, the effluents are contaminated and must be processed before the discharge thereof outside the site of the industrial installation in which the filtration apparatus is utilized. The volume of the effluents may be very large; this necessitates the utilization of costly processing stations.

In order to avoid the disadvantages set forth hereinabove, processes for the regeneration of the filtration apparatuses have been proposed which consist in cleaning the filtering elements, by means of ultrasonic waves, within the filter body itself. The ultrasonic waves are emitted within the fluid filling the filter body, in such a manner as to reach the filtering elements and to ensure the extraction of the impurities retained by these filtering elements. The impurities are collected at the lower part of the filter and may be evacuated through an evacuation conduit. The emission of ultrasonic waves within the fluid filling the filter body creates an acoustic pressure field. If the amplitude of this pressure field is sufficient, this results in a phenomenon of cavitation; for this to be the case, it is sufficient for the average underpressures created within the liquid to be at least equal to the pressure difference between the actual pressure and the vapor pressure of the liquid at the temperature considered.

This phenomenon of cavitation involving the formation of bubbles of steam may be maintained by the acoustic field. The shock waves, as well as the turbulent microcurrents which result therefrom, permit the extraction of the particles filtered and collected by the porous medium.

This cleaning operation does not necessitate the demounting or modification of the filter; the inlet and outlet fluid pipes connected to the filter body do not need to be isolated from the operating circuit except for a limited vapor.

French Certificate of Utility No. 2,421,661 discloses a process and an installation for cleaning a filter of the type described hereinabove utilizing transducers emitting ultrasonic waves which may be disposed within the wall of the filter body itself. However, the transducers used are disposed at one end of the filter body and generally on the cover. This result in an unsatisfactory operation, in the case where the acoustic emission has to affect the volume of a filtration assembly consisting of elongate filtering elements placed along the axial direction of the casing.

SUMMARY OF THE INVENTION

The object of the invention is therefore a filtration apparatus comprising a casing, an admission conduit for liquid to be filtered in the casing, an evacuation conduit for filtered liquid and a porous filtrating means between the said conduits, as well as a device for the ultrasonic cleaning of the porous filtration means comprising at least one ultrasonic transducer, it being possible for the filtration apparatus to be cleaned in an effective manner.

In order to achieve this object:

(1) the apparatus comprises a bundle of porous filtration elements which are disposed over a certain length of the casing in an axial direction and over a substantial part of its cross-section and at least one assembly of transducers which are disposed in at least one cross-sectional plane of the casing of the filtration apparatus in positions which are regularly spaced at the periphery of the casing; and (2) and each of the transducers is placed within an opening passing through the casing, in a direction perpendicular to the axis of the casing, in such a manner as to emit ultrasonic waves within the casing in the direction of the bundle of filtering elements in a zone delimitated by a cone, the axis of which extends a direction perpendicular to the filtering elements and the vertex of which is located in the vicinity of the wall of the casing.

In order to achieve this object, the subject of the invention is also a process for cleaning a filtration apparatus according to the invention.

BRIEF DESCRIPTION OF THE DRAWINGS

In order to procide a good understanding of the invention, a description will now be given, by way of example, with reference to the accompanying drawings, of several embodiments of a filtration apparatus according to the invention.

DESCRIPTION OF PREFERRED EMBODIMENT

Figure 1:
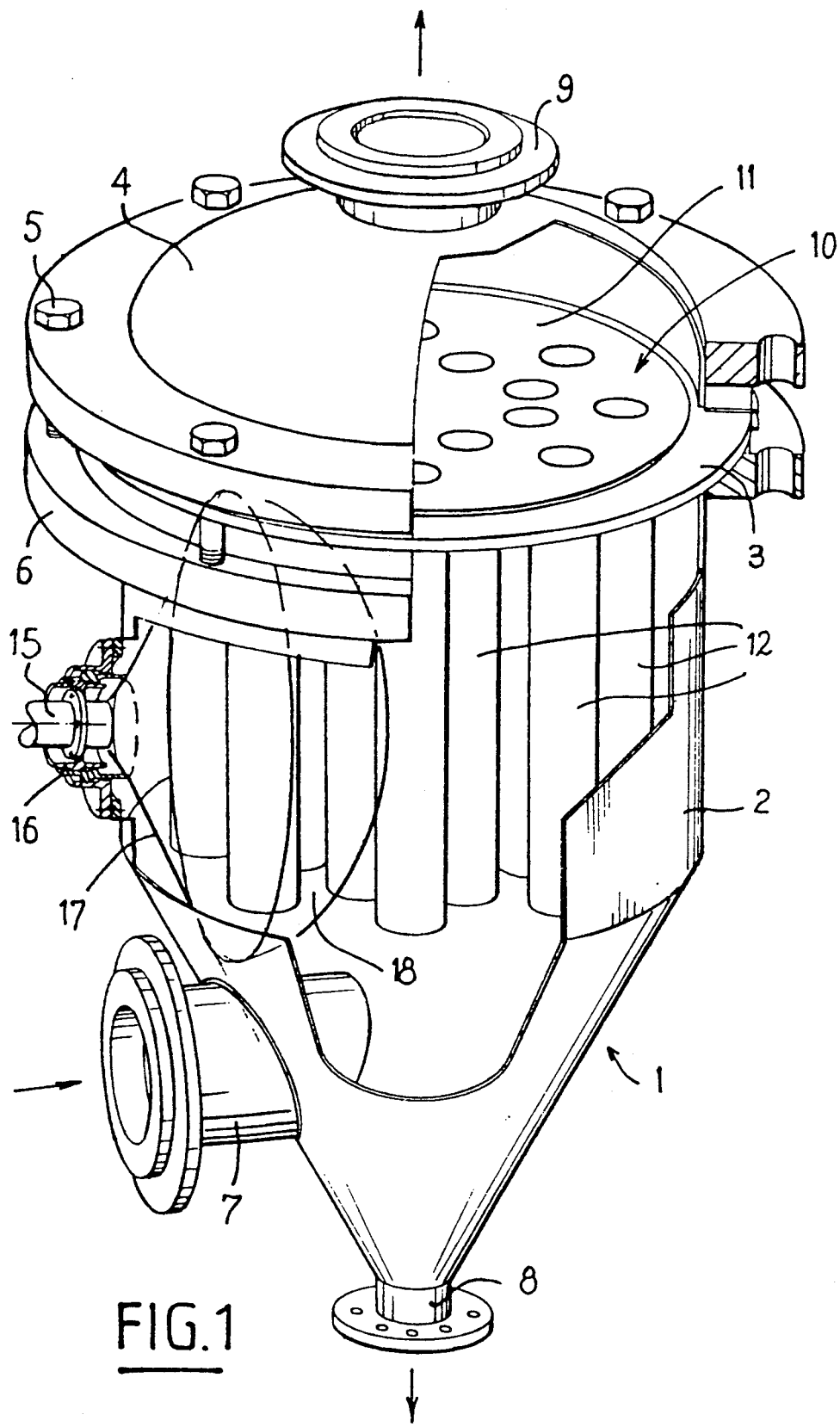
FIG. 1 is a perspective view, cut away, of the assembly of a filtration apparatus according to the invention.

FIG. 1 shows a filtration apparatus 1, comprising a casing 2 of cylindro-frusto-conical shape disposed with its axis in the vertical direction.

A flange 3 is integral with the casing 2 at its upper end. A cover 4 comes to rest on the flange 3 in such a manner as to sealingly close the casing. The cover 4 is clamped by screws 5 which are engaged into threaded holes of a clamping ring 6 integral with the casing 2.

The casing 2 comprises, in its frusto-conical lower part, a tube 7 for the admission of fluid to be filtered in the filtration apparatus and an evacuation connection 8 connected to the lowest point of the casing 2.

A connection 9 for the egress of cleaned fluid is fixed on the cover in a central position.

A filtration assembly 10 is placed within the casing 2 in such a manner as to occupy a certain length of the casing in its vertical axial direction and a substantial part of its cross-section, in its cylindrical part. This filtration assembly 10 consists of a head plate 11, resting on the flange 3, on which are fixed, at one of their ends, filtering elements 12 consisting of cylindrical cartridges which may consist of a sintered metallic material or be made from a thread, by weaving. In all cases, the material exhibits a certain porosity and will be designated hereinafter as a porous material.

The cartridges 12 are fixed parallel to one another on the head plate 11 and are placed vertically, i.e. in the direction of the axis of the casing 2, in order to constitute a bundle which is disposed over a certain length of the casing of the filtration device in the axial direction and over a substantial part of its cross-section.

The inlet connection 7 for liquid to be filtered and the connection 9 for the evacuation of filtered liquid open out on both sides of the filtration assembly 10, in the axial direction of the casing 2. The fluid to be cleaned therefore passes through the wall of the cartridges from the outside to the inside and flows along their length before emerging through openings in the head plate 11 into the space located below the cover 4.

The filtration apparatus 1 further comprises a cleaning device consisting of ultrasonic transducers 15 placed within the wall of the casing 2, in its cylindrical part and at a location situated substantially at the center of the zone occupied by the filtration assembly 10.

Figure 2:
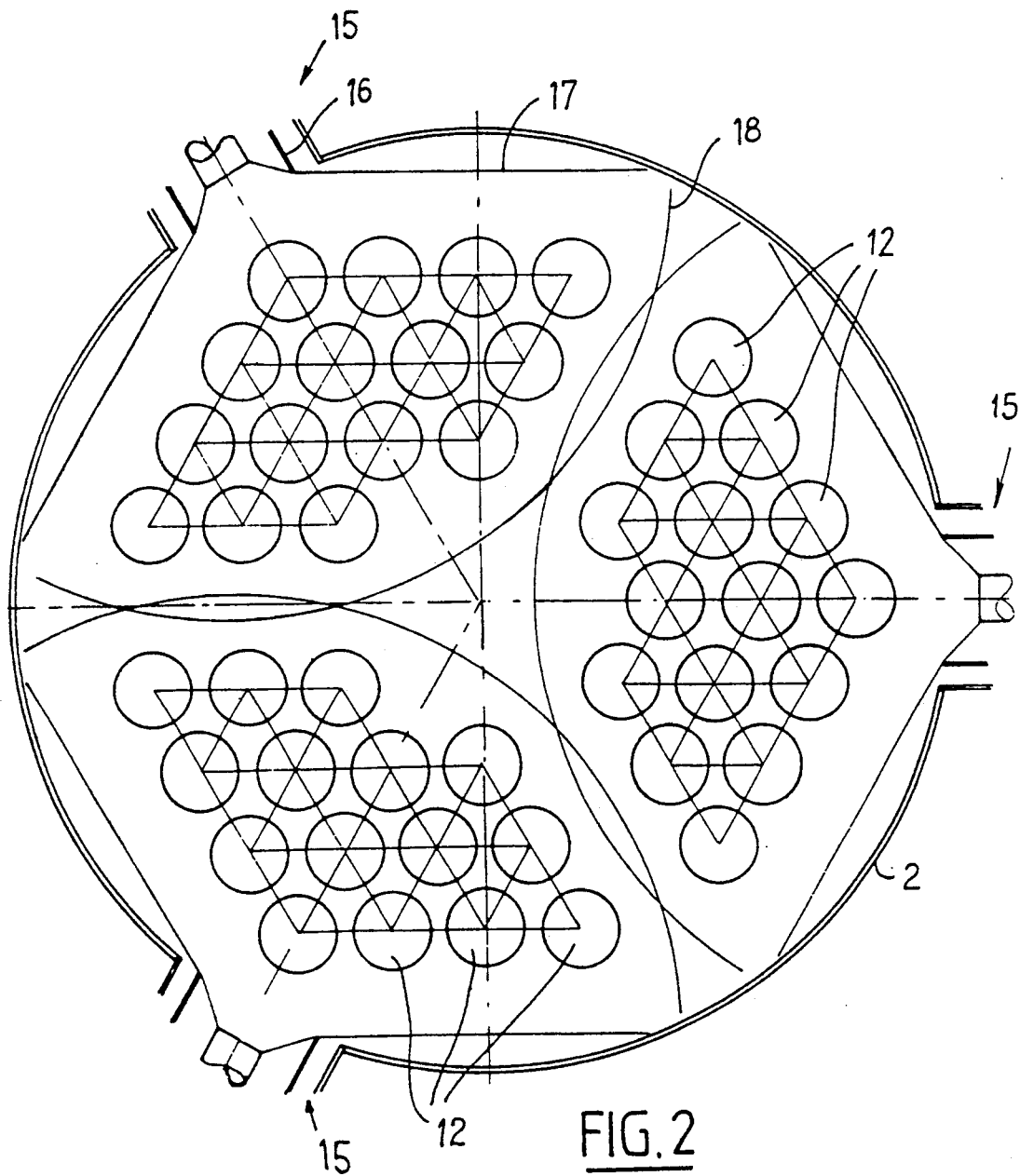
FIG. 2 is a cross-sectional view of the body of the filtration apparatus, at the level of the ultrasonic transducers.

As can be seen in FIG. 2, in the case of a filtration apparatus comprising forty-five filtration cartridges 12, use is made of three transducers 15 in positions situated at 120° from one another around the cylindrical casing 2.

The transducers 15 are fixed in sealed manner, for example by welding of a fixing plate, to the inside of a traversing sleeve 16 of the wall of the casing 2.

Each one of the transducers, when the cleaning device is in service, emits ultrasonic waves of a frequency and power chosen to ensure in an effective manner the cleaning of the filtering elements 12, within a volume delimited by a conical surface 17 of vertical angle α which is a function of the frequency, and by a spherical surface 18 of radius R which is a function of the power emitted, the vertex of the cone 17 and the center of the sphere 18 being located in proximity to the wall of the casing 2.

FIG. 2 shows the section of the zone of effectiveness of the ultrasonic waves of each one of the transducers 15, through the horizontal plane of the figure.

It is seen that, in the case of a filtration apparatus comprising forty-five cartridges distributed in the manner represented, each one of the transducers 15 ensures the cleaning of fifteen filtering elements.

The angle of the cone 17 delimiting the zone of effectiveness of a transducer is generally of the order of 90° to 100° and the radius of the sphere 18 of the order of 40 cm.

However, the angle of the cone of effectiveness 17 may be broadened to about 120° by a diffraction effect on the internal edge of the traversing sleeve 16 of the transducer 15, when this transducer is placed so in recessed position relative to the wall of the caseing 2.

Figure 3:
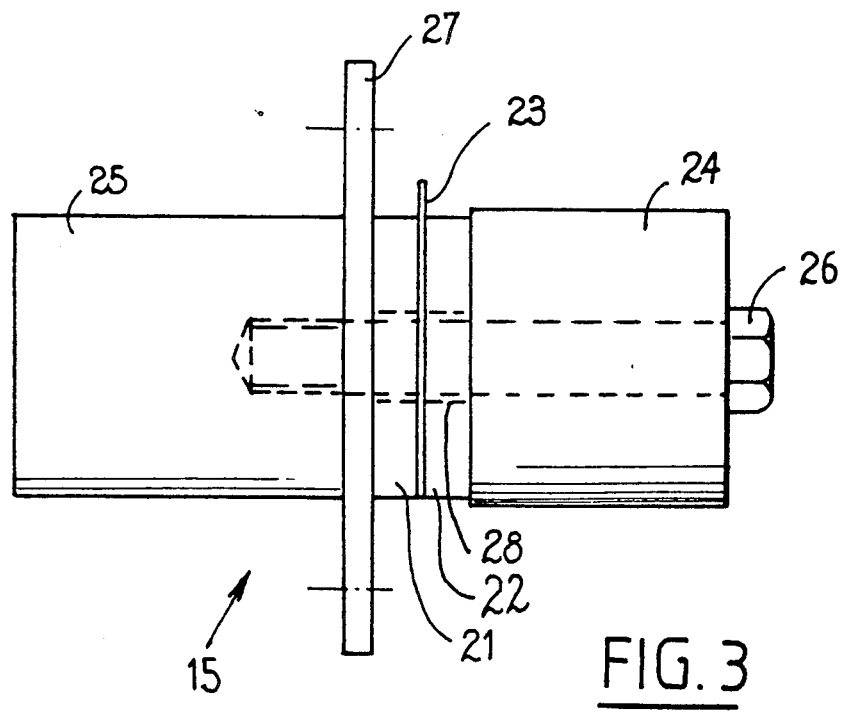
FIG. 3 is a side view of an ultrasonic transducer.

FIG. 3 shows an ultrasonic transducer of the piezoelectric type. This transducer comprises two plates 21 and 22 of piezoelectric ceramic supplied with electric current by means of a connector 23. The plates 21 and 22 are clamped between two metallic masses 24 and 25 by means of a screw 26 disposed along the axis of the plates and of the metallic masses.

The metallic mass 24 constituting the rear part of the transducer ensures the attenuation of the waves emitted in the direction opposite to the emission direction.

The metallic mass 25 disposed in front of the transducer constitutes an emitting horn for the ultrasonic waves generated by the plates 21 and 22. A fixing plate 27 is fixed at the periphery of the emitting horn 25 in a position corresponding to a vibration node of this horn. The screw 26, in its part traversing the piezoelectric plates 21 and 22, is engaged into a sleeve 28 permitting the insulation of the screw to be ensured.

Figure 4:
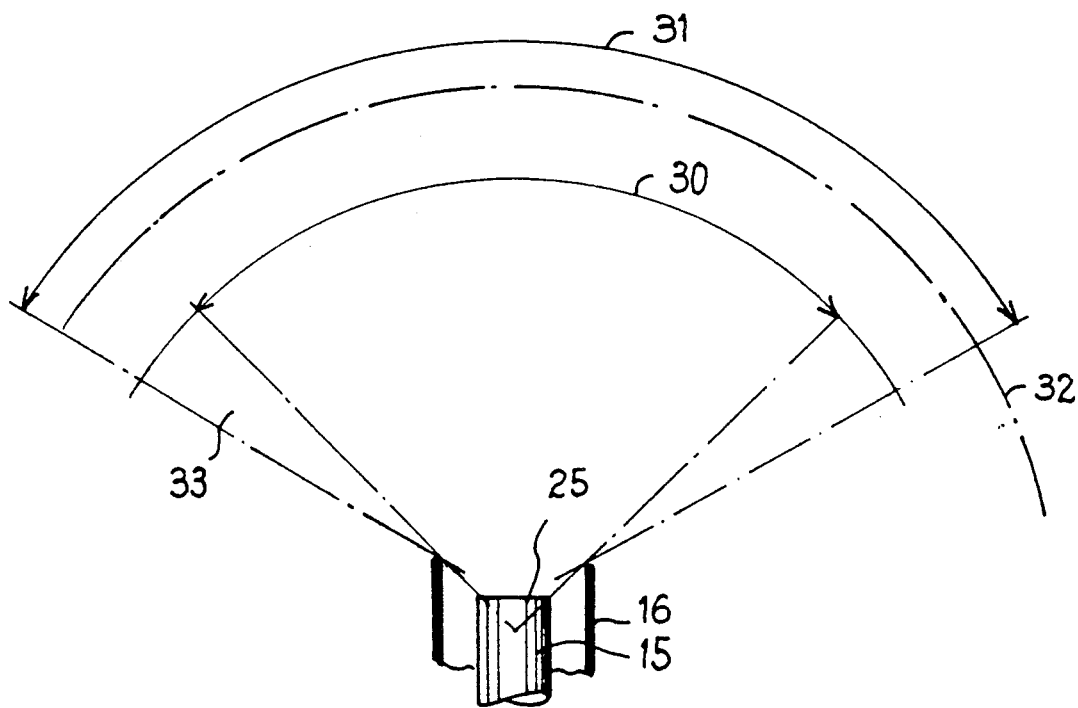
FIG. 4 is a schematic view showing the arrangement of an ultrasonic transducer and the zone of effectiveness of the acoustic emission produced.

FIG. 4 shows schematically a transducer 15 of the type which has just been described, placed within a traversing sleeve 16 of the casing of a filter body.

The transducer 15 is fixed in the sleeve 16, in such a manner that the front end face of its emitting horn 25 is slightly recessed in relation to the end of the sleeve 16 directed towards the interior of the casing.

It is seen that the beam of ultrasonic waves emitted within a cone having a vertical angle 30 substantially equal to 90° is diffracted by the end edge of the sleeve 16, in such a manner that the cone of effectiveness of the ultrasonic waves has a semi-vertical angle increased by approximately 15°.

The result of this is that the vertical angle 31 of the cone of effectiveness, after diffraction at the end of the sleeve 16, is close to 120°.

In the case of the illustrated embodiment, the zone of effectiveness of the ultrasonic waves within the filter is delimited, at the location of each one of the transducers 15, by a cone of vertical angle 120° and by a sphere 32, the radius of which is close to 40 cm. The section 33 of this zone, in a horizontal plane passing through the axis of the transducer 15, is represented in FIG. 4.

Zones of identical shape have been represented in FIG. 2, in the case of three transducers ensuring the cleaning of three sets of filtering elements.

The mounting of the transducer 15 and of the sleeve 16 on the casing of the filter may be implemented in a very simple manner by by welding sleeve 16 in a connection traversing the casing and the fixing, and by welding of the transducer 15 within the sleeve 16, by means of the fixing plate 27. This results in a final setting-up of the cleaning means on the body of the filter, and in perfect sealing.

However, such an arrangement does not permit the regulation of the zone of effectiveness of the ultrasonic waves.

A description will now be given, with reference to FIGS. 5, 6 and 7, of arrangements permitting the regulation, to a certain extent, of the dimensions of the zone of effectiveness of the ultrasonic waves.

Figure 5:
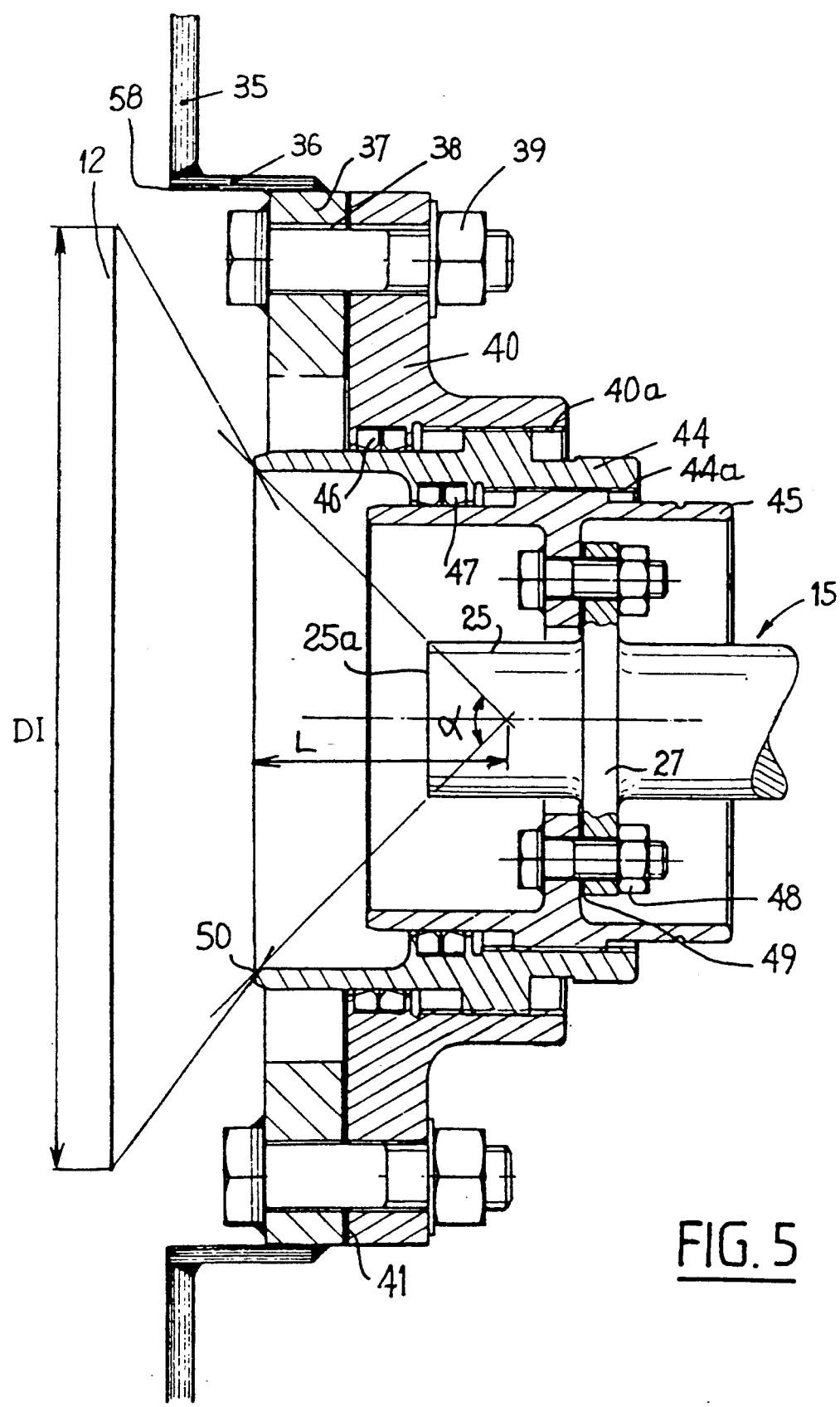
FIG. 5 is a cross-sectional view showing the mounting of an ultrasonic transducer in the wall of the filtration apparatus, according to a second embodiment.

FIG. 5 shows a part of the wall 35 of the casing of a filter according to the invention, at the location of a passage opening of an ultrasonic transducer 15. A connection 36 is fixed in the opening of the wall 35, the axis of the horizontal connection 36 having a radial direction, i.e., perpendicular to the axis of the casing of the filter.

A ring 37 is fixed by welding within the connection 36. This ring 37 comprises holes for the passage of screws 38, for the fixing of a flange 40 by means of screwed assemblies 39. A seal 41 is intercalated between the ring 37 and the flange 40. The flange 40 comprises an internal threaded part 40a in which a ring 44 threaded on its external surface is engaged.

The ring 44, referred to as the external ring, is threaded at its internal part 44a and receives a second ring 45 or internal ring comprising a thread on its external surface. Sliding seals 46 and 47 are intercalated, respectively between the flange 40 and a smooth part of the external surface of the ring 44 and between the external ring 44 and a smooth part of the external surface of the internal ring 45.

The transducer 15, the structure of which is similar to that described with reference to FIG. 3, is fixed to the internal part of the ring 45 by means of the fixing plate 27 attached in a sealed manner to an internal shoulder of the ring 45, by virtue of screwed assemblies 48 and of a seal 49.

The device as represented in FIG. 5 permits regulation, on the one hand, of the position of the transducer 15 in relation to the lateral surface of the filtering assembly 12, in the radial direction corresponding to the axis of the transducer and, on the other hand, of the position of the front face of the emitting horn 25 of the transducer 15 in relation to the end face 50 of the outer ring 44.

The position of the transducer 15 in relation to the filtering assembly 12 may be regulated by screwing or by unscrewing the ring 44 within the threading 40a.

The position of the front face of the emitting horn 25 of the transducer 15, in relation to the end section of the outer ring 44, may be regulated by screwing or by unscrewing the internal ring 45 within the threading 44a.

The displacement of the emitting face 25a of the transducer 15 in relation to the section 50 of the outer ring permits the regulation of the position of the zone of interception of the cone of emission of the transducer (of vertical angle α substantially equal to 90°) by regulation of the length L separating the vertex of the cone of emission from the edge 50 constituted by the end of the ring 44.

The displacement of the transducer 15 in relation to the lateral face of the filtering assembly 12 permits the regulation of the diameter of interception DI of the filtering elements by the ultrasonic waves emitted.

These various regulations permit the adaptation of the opening and the position of the cone of effectiveness of the ultrasonic waves to the dimensions of the filtering assembly.

It should be noted that, when the filtering assembly has a relatively large height, the transducers 15 may be arranged in a plurality of sets situated in horizontal planes located at various levels along the height of the casing of the filter. The regulation of the transducers will then be carried out in such a manner that the various zones of effectiveness along the height of the filtering elements are superposed or intersect slightly, in order to affect the entire height of the filtering elements.

Likewise, the distance, in the radial direction, between the emission face of the transducer 15 and the filtering elements, is regulated in such a manner that the sphere of effectiveness of the ultrasonic waves encompass the desired set of filtering elements.

When the regulation has been carried out, is locked in position relative to the flange 40, and the inner ring 45 is locked in position relative the outer ring 44 in relation to the flange 40 and of the inner ring 45 in to the outer ring 44.

Figure 6:
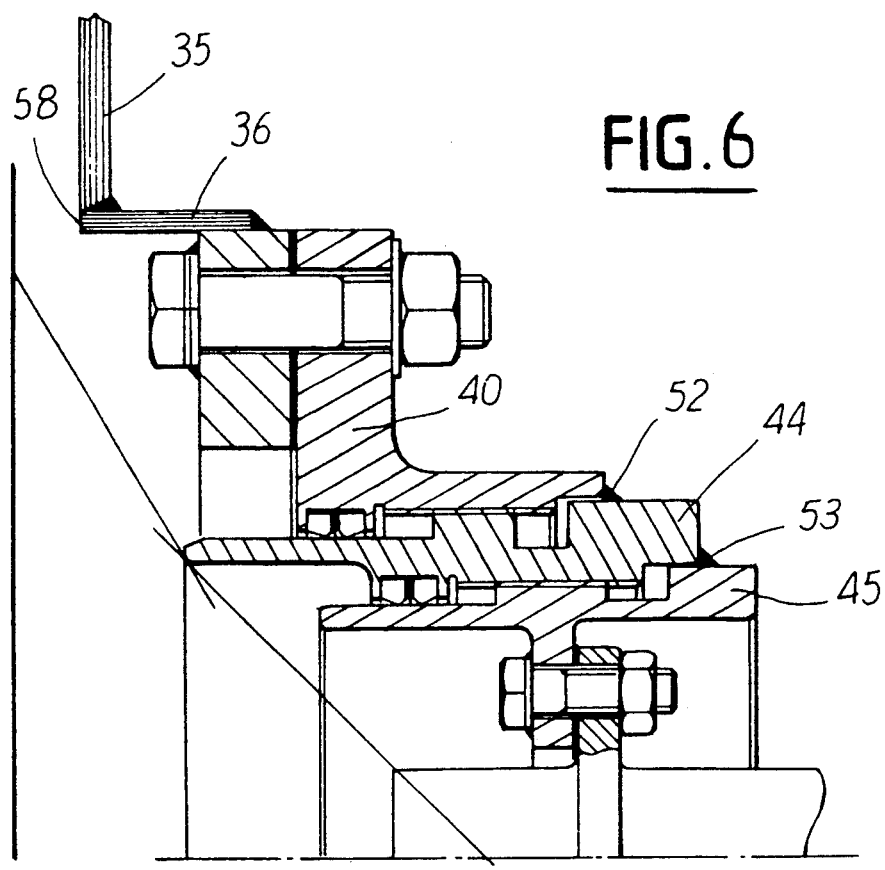
FIG. 6 is a cross-sectional half-view showing the mounting of an ultrasonic transducer in the wall of the filtration apparatus, according to a third embodiment.
Figure 7:
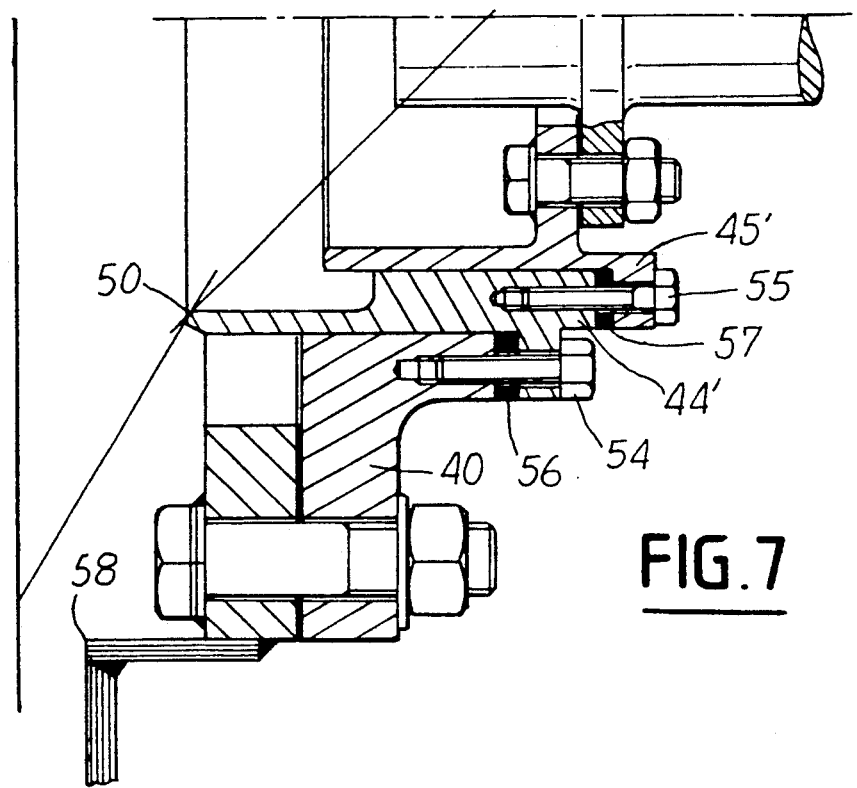
FIG. 7 is a cross-sectional half-view showing the mounting of an ultrasonic transducer in the wall of the filtration apparatus according to a fourth embodiment.

FIGS. 6 and 7 show two further, embodiments of this locking in position, the elements in FIGS. 6 and 7 bearing the same references as the corresponding elements in FIG. 5.

The device according to the embodiment of FIG. 6 is characterized by a locking in position of the outer ring 44 in relation to the flange 40 and of the inner ring 45 in relation to the outer ring 44, by welded joints, 52 and 53 respectively. The welded joints 52 and 53 likewise provide the sealing between the corresponding pieces.

In the embodiment represented in FIG. 7, the locking in position of the outer ring 44' in relation to the flange 40 and of the inner ring 45' in relation to the outer ring 44' is implemented respectively by screws 54 and 55. Seals 56 and 57 permit the provision of the sealing between the corresponding pieces.

It should be noted that, in all cases, it is possible to displace the transducer 15 in relation to the flange 40 in such a manner that the beam of ultrasonic waves which is diffracted by the end surface 50 of the outer ring 44 (or 44') is likewise diffracted by the connecting edge 58 between the connection 36 and the wall of the filter casing 35.

The filtration apparatus according to the invention comprising integrated cleaning devices is very easy to maintain, since the porous filtration elements may be regenerated without any prior demounting. In order to carry out the regeneration, it is sufficient to isolate the filter body from the circuit on which it is intercalated, by closing valves on the fluid admission and evacuation conduits. The casing of the filter body is then filled with fluid isolated from the circuit. The various transducers placed within the casing of the filter are then supplied in such a manner as to generate ultrasonic waves, the zones of effectiveness of which cover, in their entirety, the filtering elements 12. The ultrasonic waves are transmitted by the fluid filling the casing of the filter.

The particles retained by the filtering elements are torn out from the pores of these elements, in accordance with the phenomenon described hereinabove.

The particles fall, under gravity, into the base of the casing of the filter, where they accumulate.

When the cleaning has permitted the restoration of sufficient permeability of the filtering elements, the supply to the transducers is cut off and the particles torn out from the filter are evacuated via the evacuation conduit 8.

The filter may be put back into service immediately.

It is possible to use, depending upon the arrangement and the dimensions of the filtering elements, a single transducer or a set of transducers distributed at the periphery of the casing, either in a single horizontal plane or in horizontal planes spaced along the height of the filter and angularly offset, in order to obtain an intersection of the cones of emission of the various transducers and thus an effective action, in the entire volume of the filter.

It is possible to use magnetostrictive transducers, as well as piezoelectric transducers.

The mounting of these transducers either in fixed position or in a regulable position in the wall of the filter may be implemented in a manner different from those which have been described.

Finally, the invention is applicable to of any filtration apparatus comprising a casing in which are placed filtering elements used for the filtration of fluids in the field of the nuclear industry or in other industries such as the chemical industry producing or using dangerous fluids. The device according to the invention is particularly well suited to the case of filters, the filtration elements of which become rapidly clogged.

We claim:

1. Filtration apparatus comprising a casing (2), an inlet conduit (7) for liquid to be filtered in said casing (2), an evacuation conduit (9) for filtered liquid, a bundle of spaced porous filtration cartridges (12) disposed over a predetermined length of said casing (2) in an axial direction and over a substantial part of a cross-section of said casing, and fixed at one of their axial ends to a head plate, the inlet conduit and the evacuation conduit opening out on both sides of the filtration assembly in the axial direction and the head plate being disposed transversely in the casing so that the liquid to be filtered is forced through the filtration elements, and a device for ultrasonic cleaning (15, 16) of said porous filtration cartridges (12), said device being constituted by spaced assemblies of transducers (15) disposed in at least one cross-sectional plane of said casing intermediate between axial ends of said filtration cartridges in positions which are regularly spaced at a periphery of said casing, each of said transducers (15) being positioned within an opening passing through said casing, in a direction perpendicular to an axis of said casing, in such a manner as to emit ultrasonic waves, within said casing (2) in the direction of said bundle of filtration cartridges (12) in a zone delimited by cones having axes perpendicular to said filtering cartridges and a vertex adjacent a wall of said casing.

2. Filtration apparatus according to claim 1, comprising at least two sets of transducers (15) each disposed in a cross-sectional plane of said casing (2), planes containing said transducers (15) being spaced along an axial direction of said casing (2).

3. Filtration apparatus according to claim 1, wherein said transducers are each disposed, in a said opening of said casing (2), within a sleeve (16), having an axis extending in a direction perpendicular to said filtration cartridges, so as to be recessed in relation to an end face of said sleeve (16) which is directed toward an interior of said casing (2) in such a manner that a beam of ultrasonic waves emitted by a said transducer (15) is diffracted on said end face (50) of said sleeve (16) which is directed towards the interior of said casing (2).

4. Filtration apparatus according to claim 1, wherein said transducers comprises at least one means for emission of ultrasonic waves in contact with a metallic mass constituting an emitting horn and a fixing plate on said casing of the filter which is fixed at the periphery of said emitting horn, in a position corresponding to a vibration node of said emitting horn.

5. Filtration apparatus according to claim 1, wherein said transducers is are fixed within an inner ring having a threaded external surface engaged with a threaded part of an outer ring, said outer ring itself comprising a threaded part on its external surface engaged with a threaded part of a flange fixed in the passage opening of said transducers in said casing, said flange, said outer ring and said inner ring all being coaxial and having as their common axis the radial direction of said opening of said casing (2), such that the position of said transducers (15) in the radial direction may be regulated by screwing and unscrewing said outer ring (40) in said threaded part (40a) and that the position of said transducers (15) relative to said end face (50) of said outer ring (44) which is directed towards the interior of said casing (2) can be regulated by screwing and unscrewing of said inner ring (45) in said threaded part (44a).

6. Filtration apparatus according to claim 5, wherein said outer ring (44) is made integral with the flange (40) by a continuous welded joint (52) ensuring the sealed joining of said outer ring and said flange, and said inner ring (45) is made integral with said outer ring (44) by a second continuous welded joint (53) ensuring the sealing between said inner ring and said outer ring.

7. Filtration apparatus according to claim 5, wherein said outer ring is made integral with said flange by a first screwed connection, and said inner ring is made integral with said outer ring by a second screwed connection, seals being intercalated between said flange and said outer ring and between said outer ring and said inner ring, respectively.

8. Process for ultrasonic cleaning of a filtration apparatus disposed in a circuit for supply of fluid to be filtered and for recovery of filtered fluid, said apparatus comprising a casing (2), an inlet conduit (7) for liquid to be filtered in said casing (2), an evacuation conduit (9) for filtered liquid, a bundle of porous filtration cartridges (12) disposed between said inlet conduit and said evacuation conduit over a predetermined length of said casing (2) in an axial direction and over a substantial part of a cross-section of said casing, and a device for ultrasonic cleaning (15, 16) of said porous filtration cartridges (12) constituted by spaced assemblies of transducers (15) disposed in at least one cross-sectional plane of said casing (2) in positions which are regularly spaced at a periphery of said casing (2), each of said transducers being placed within an opening passing through said casing, the process comprising the steps of (a) isolating said casing from said circuit for recovery of filtered fluid;

(b) emitting ultrasonic waves by means of said transducers within cones having axes perpendicular to said filtration cartridges and a vertex located adjacent a wall of said casing (2) in the direction of said filtration cartridges (12), in such a manner as to tear out particles retained by said filtration cartridges (12);

(c) diffracting said ultrasonic waves emitted towards the interior of said casing (2) by an edge (50, 58) centered on an axis of emission of said ultrasonic waves; in such a manner as to increase a vertical angle of said cones of effectiveness within which said ultrasonic waves are emitted; and (d) evacuating said particles torn out from the filtration cartridges (12) via an end of said casing (2).

* * * * *